United States Patent
Drocco

(10) Patent No.: US 11,731,286 B2
(45) Date of Patent: Aug. 22, 2023

(54) METHOD FOR APPLYING LINERS INSIDE CONTAINERS

(71) Applicant: DROMONT S.p.A., Grinzane Cavour (IT)

(72) Inventor: Luca Drocco, Alba (IT)

(73) Assignee: DROMONT S.p.A., Grinzane Cavour (IT)

( * ) Notice: Subject to any disclaimer, the term of this patent is extended or adjusted under 35 U.S.C. 154(b) by 565 days.

(21) Appl. No.: 16/812,425

(22) Filed: Mar. 9, 2020

(65) Prior Publication Data
US 2020/0290771 A1  Sep. 17, 2020

(30) Foreign Application Priority Data
Mar. 11, 2019  (IT) .................. 102019000003475

(51) Int. Cl.
| | |
|---|---|
| *B25J 15/00* | (2006.01) |
| *B31B 50/81* | (2017.01) |
| *B65D 25/16* | (2006.01) |
| *B31B 120/40* | (2017.01) |
| *B65G 59/10* | (2006.01) |

(Continued)

(52) U.S. Cl.
CPC .............. *B25J 15/00* (2013.01); *B31B 50/81* (2017.08); *B65D 25/16* (2013.01); *B23P 19/006* (2013.01); *B23P 19/04* (2013.01); *B31B 2120/40* (2017.08); *B65G 59/106* (2013.01)

(58) Field of Classification Search
CPC ...... B25J 15/00; B31B 50/81; B31B 2120/40; B65D 25/16; B23P 19/006; B23P 19/04; B65G 59/106; B29C 63/34; B65B 61/20
See application file for complete search history.

(56) References Cited

U.S. PATENT DOCUMENTS

| | | | | |
|---|---|---|---|---|
| 3,018,702 A | * | 1/1962 | Bauder | ................... B31B 50/00 493/93 |
| 3,671,349 A | * | 6/1972 | Westlake, Jr. | ........ B29C 66/634 156/287 |

(Continued)

FOREIGN PATENT DOCUMENTS

| | | |
|---|---|---|
| EP | 0594921 A1 | 5/1994 |
| EP | 2314518 A1 | 4/2011 |
| GB | 2509746 A | 7/2014 |

OTHER PUBLICATIONS

European Search Report dated Nov. 4, 2019. 6 pages.

*Primary Examiner* — Stephen A Vu
(74) *Attorney, Agent, or Firm* — RMCK Law Group PLC

(57) ABSTRACT

A method for applying liners inside containers includes: providing a plurality of liners each having a bottom wall, a side wall, an upper opening opposite the bottom wall and a fold extending around the edge of the upper opening; placing the plurality of liners in at least one vertical stack in which the liners are upside down and one inside the other; pulling the liner at the top of the stack out of the stack in a vertical direction and overturning the liner so as to orient it vertically with the upper opening facing upwards; inserting a gripping tool into the liner and gripping the liner with the gripping tool; inserting the gripping tool and the liner held thereby inside a container and placing the liner inside the container; and releasing the liner into the container and removing the gripping tool from the container.

5 Claims, 5 Drawing Sheets

(51) Int. Cl.
    *B23P 19/00* (2006.01)
    *B23P 19/04* (2006.01)

(56) References Cited

U.S. PATENT DOCUMENTS

| | | | | |
|---|---|---|---|---|
| 4,708,706 A | * | 11/1987 | Doderer | B31B 50/00 |
| | | | | 493/252 |
| 5,120,292 A | * | 6/1992 | Ueda | B31B 50/322 |
| | | | | 493/134 |
| 2020/0180817 A1 | * | 6/2020 | Varrichione | B65D 25/16 |

* cited by examiner

METHOD FOR APPLYING LINERS INSIDE CONTAINERS

CROSS-REFERENCE TO RELATED APPLICATIONS

This application claims priority to Italian Patent Application No. 102019000003475 filed Mar. 11, 2019. The disclosure of the above application is incorporated herein by reference in its entirety.

FIELD OF THE INVENTION

The present invention relates to a method for applying liners inside containers.

The invention was developed in particular with a view to its application in the industry for preparing and dosing paints and related products. In the following description, reference will be made to this specific application field without, however, losing generality.

DESCRIPTION OF THE PRIOR ART

Paints are usually prepared or simply dosed inside cylindrical containers with an open upper edge, in which ready paints are dosed or quantities of paints, dyes and diluting products are dosed and subsequently mixed.

Paint containers are usually made of plastic or sheet metal. After filling, the containers are closed by a lid which closes the open upper edge of the container.

The document DE4126964-A1 describes a container for paints and the like, inside which a recyclable liner resistant to the product contained therein is applied and which, after use, can be removed from the container leaving the container clean. After use by the end user, the containers can be returned empty to the manufacturer or distributor and can be reused an indefinite number of times, reducing the environmental impact.

The use of a liner inside paint containers allows:
  reducing the quantity of materials to be disposed of as waste after use;
  reducing the production of plastic or metal containers; and
  reducing the production costs of the containers while providing environmental advantages.

However, in the state of the art there are no methods or apparatuses that can be used on an industrial scale to quickly and efficiently apply removable liners inside paint containers.

OBJECT AND SUMMARY OF THE INVENTION

The present invention aims to provide a method and an apparatus for automatically applying liners inside containers intended, for example, to be filled with paints.

According to the present invention, this object is achieved by a method and by an apparatus having the characteristics forming the subject of claims 1 and 6.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

DETAILED DESCRIPTION

Figure 1:
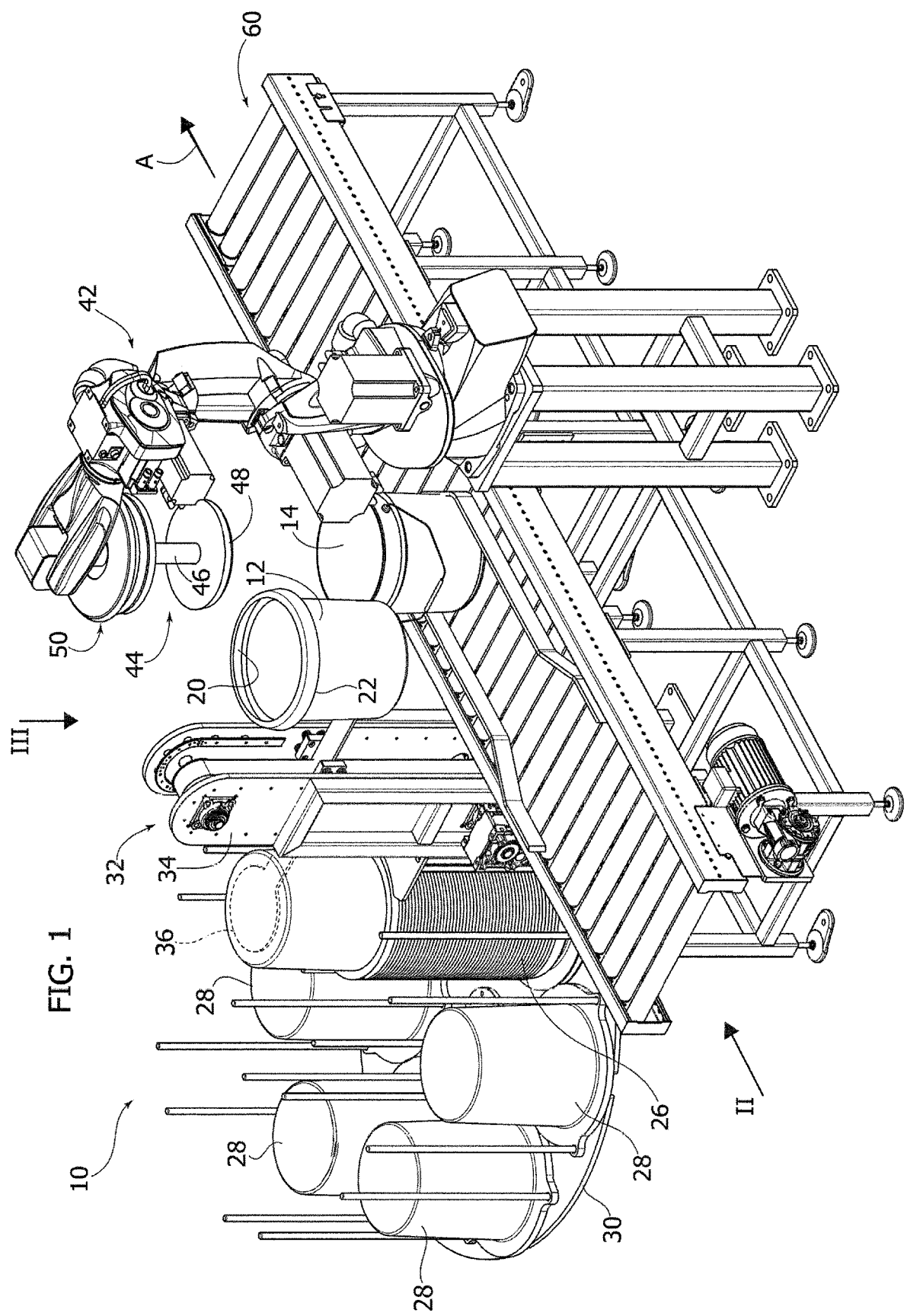
FIG. 1 is a perspective view of an automatic apparatus for applying liners inside containers.
Figure 2:
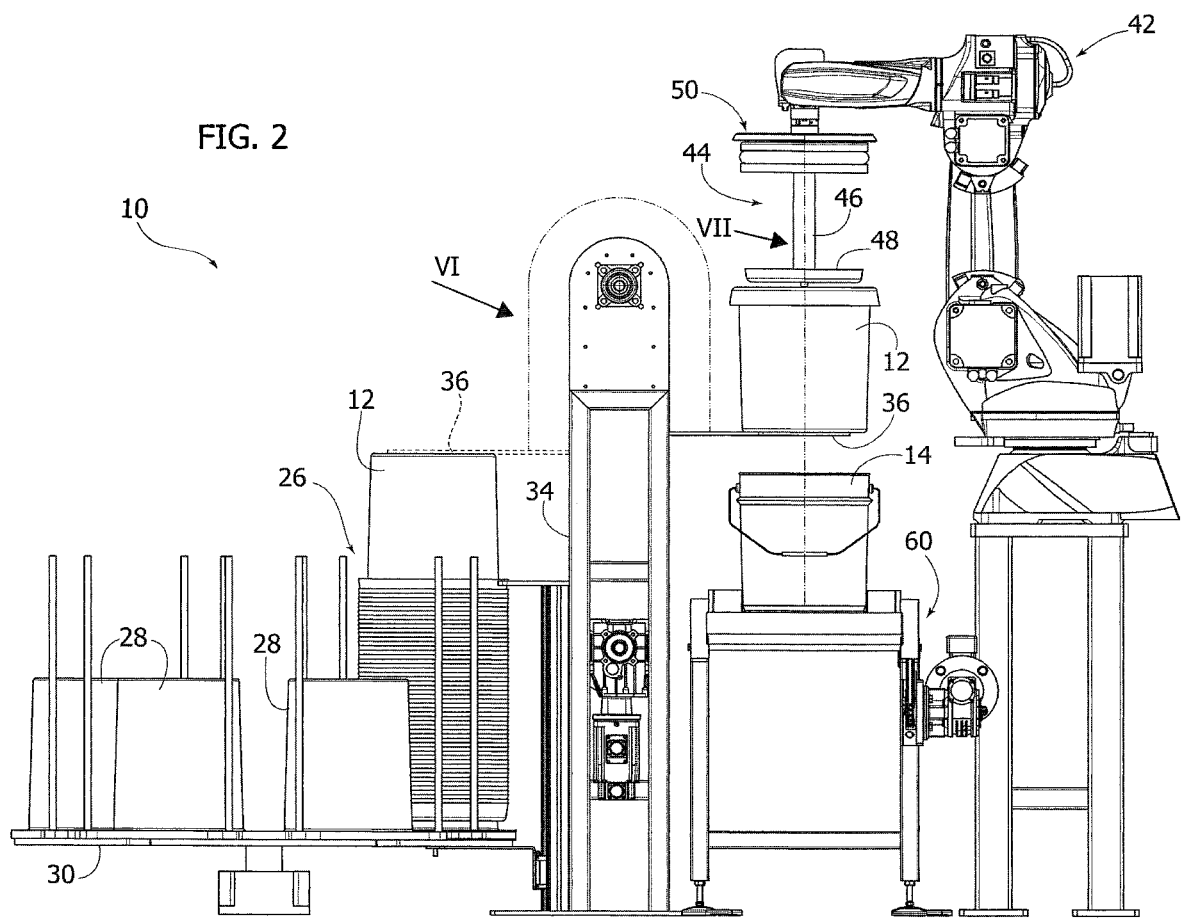
FIGS. 2 and 3 are, respectively, a side view and a plan view according to the arrows II and III of FIG. 1, FIGS. 4 and 5 are a side view and a plan view of a liner.
Figure 3:
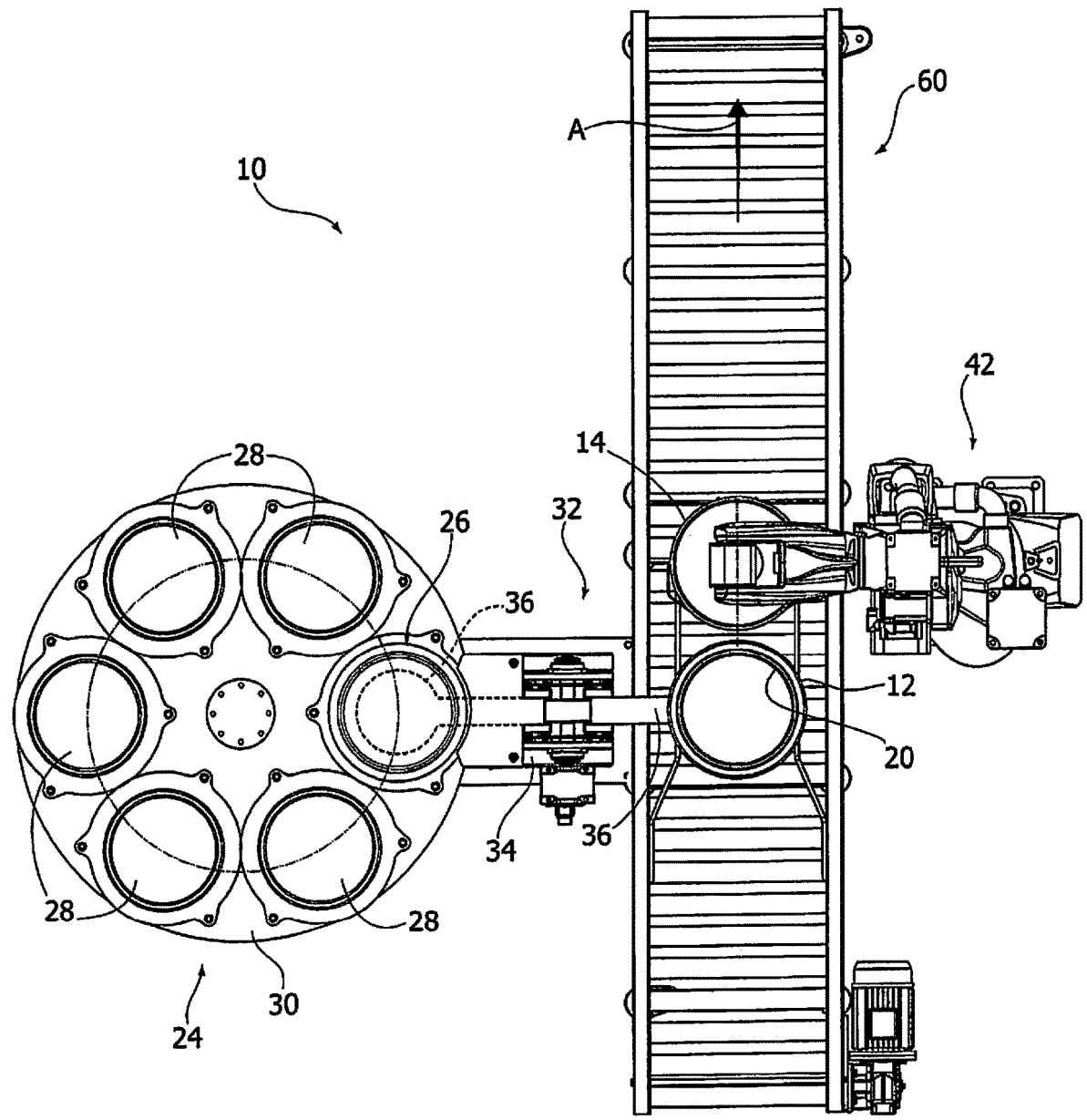

With reference to FIGS. 1-3, numeral 10 indicates an apparatus for applying liners 12 inside containers 14. In the illustrated example, the containers 14 are containers for paints made of plastic material or sheet metal. The containers 14 have a cylindrical shape with a closed bottom and an open upper edge, and can be provided with a handle hinged to the side wall.

Figure 4:
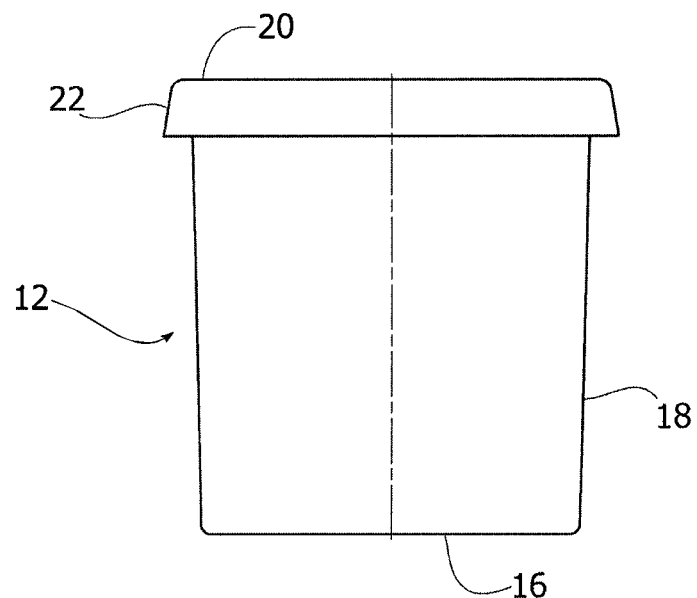
Figure 5:
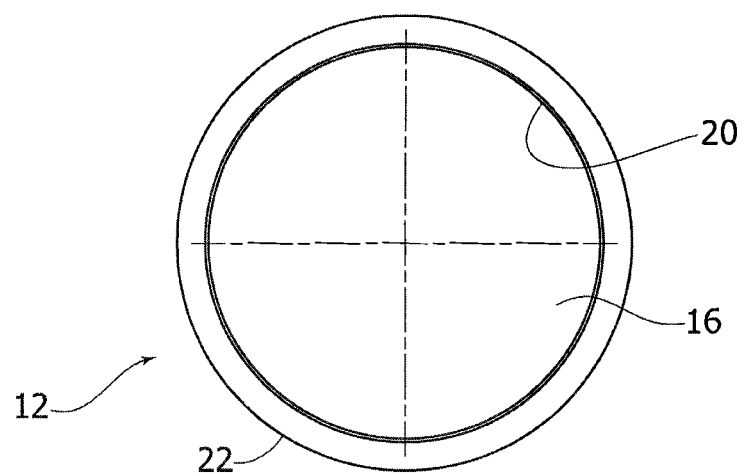

As shown in FIGS. 4 and 5, each liner 12 has a closed bottom wall 16, a side wall 18 and an upper opening 20 opposite the bottom wall 16. The side wall 18 at its upper end forms a fold 22, which extends along the edge of the upper opening 20. The liners 12 can be formed of a film of plastic material, for example, PET, with a thickness of the order of 0.2-0.5 mm.

The apparatus 10 comprises a stock 24 in which a plurality of liners 12 are arranged in at least one vertical stack 26. In the illustrated example, the stock 24 comprises a plurality of positions 28 carried by a circular table 30 rotatable around a central vertical axis. Each of the positions 28 is configured to receive a respective stack 26. Each stack 26 is formed by a plurality of liners 12 turned upside down and one inside the other. In each stack 26, the liners 12 are arranged with the upper opening 20 oriented downwards and the bottom wall 16 oriented upwards.

The apparatus 10 comprises a de-stacking device 32 including a stationary upright 34 and a pick-up element 36, movable with respect to the stationary upright 34 along an inverted U-shaped path. The pick-up element 36 has, substantially, the shape of a pallet and is provided with gripping elements configured for gripping the bottom wall 16 of the liner 12 located at the top of the stack 26 located in front of the de-stacking device 32. The pick-up element 36 can, for example, be provided with suctions cups configured for gripping the bottom wall 16 of a liner 12 by suction.

Figure 6:
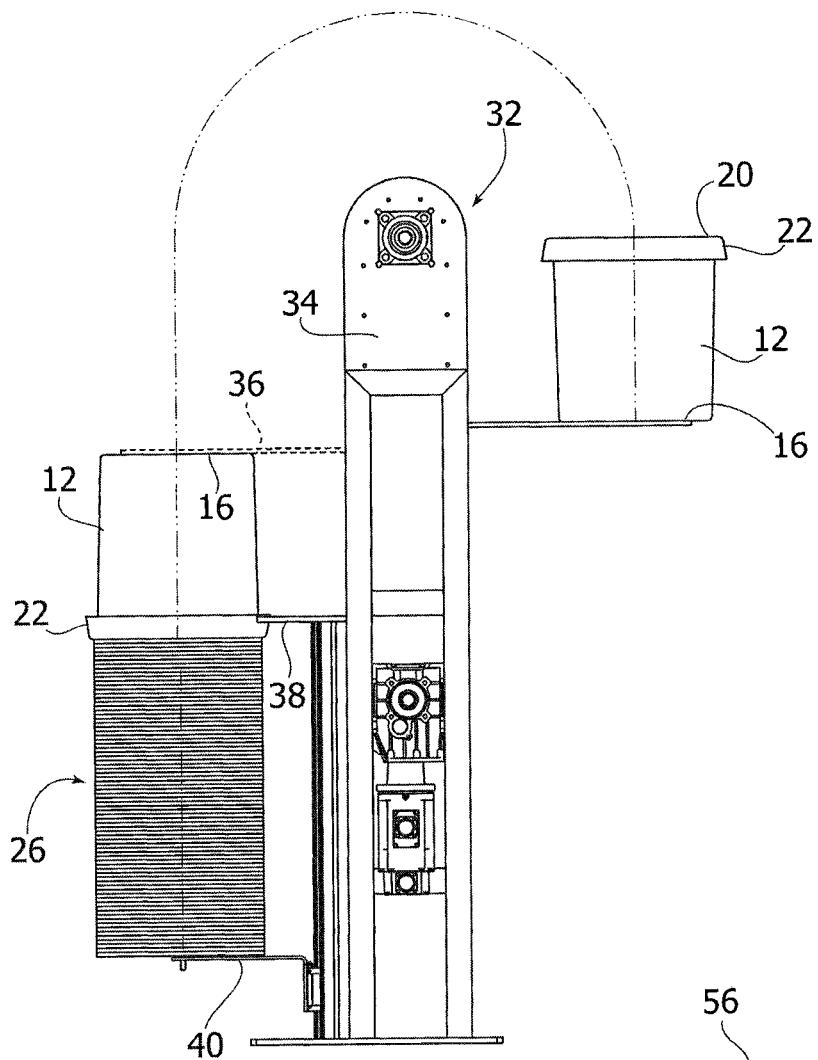
FIG. 6 is a schematic side view illustrating the operation of the de-stacking device of the liners indicated by the arrow 6 in FIG. 2.

As illustrated in FIG. 6, during operation, the pick-up element 36 of the de-stacking device 32 comes into contact with the bottom wall 16 of the liner 12 located at the top of the stack 26 and grips the bottom wall 16, for example, by means of vacuum gripping elements. After gripping the bottom wall 16 of a liner 12, the pick-up element 36 moves upwards for a stroke with a length equal to or greater than the height of the liner 12, so as to disengage the liner 12 from the stack 26. After the stroke in the vertical direction, the pick-up element 36 rotates by 180° about a horizontal axis, so as to overturn the liner 12 by 180°, so that following the overturning the liner 12 is oriented with the bottom wall 16 facing downwards and the upper opening 20 facing upwards.

The de-stacking device 32 may comprise a retaining element 38 configured to retain the second liner 12 of the stack 26, i.e. the liner 12 located immediately below the liner 12 located at the top of the stack 26. The retaining element 38 may serve to prevent two or more liners 12 from being removed simultaneously from the stack 26.

The de-stacking device 32 may also comprise a lifting device 40 which raises the stack 26 as liners 12 are removed from the top of the stack 26, so that removing the liners 12 by the pick-up element 36 can always be carried out at the same height.

Figure 7:
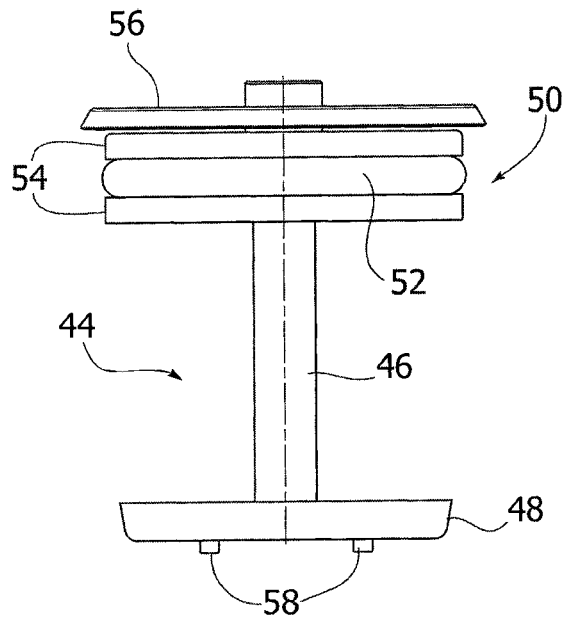
FIG. 7 is a side view of a tool for gripping the liners indicated by the arrow VII in FIG. 2.

The apparatus 10 comprises a manipulator 42 which can, for example, be an anthropomorphic robot. The manipulator 42 carries a gripping tool 44 configured for gripping the liners 12 after they have been de-stacked and oriented with the upper opening facing upwards by the de-stacking device 32. With reference to FIG. 7, the gripping tool 44 comprises a central vertical stem 46, a lower plate 48 and an upper gripper 50. The upper gripper 50 may comprise an expandable annular membrane 52 connected to a source of compressed air. The expandable annular membrane 52 may be located between two rigid plates 54 fixed to the upper end of the central stem 46. The gripping tool 44 may further comprise a pressing element 56 having the shape of an annular crown, movable in a vertical direction between a raised position and a lowered position. The gripping tool 44 may comprise proximity sensors 58 arranged on the lower surface of the lower plate 48.

The apparatus 10 can further comprise a conveyor 60, for example, a roller conveyor, arranged to advance containers 14 in the direction A.

During operation, the empty containers 14 advancing on the conveyor 60 are stopped in a liner application station. The de-stacking device 32 picks up a liner 12 from the top of a stack 24, and overturns it as illustrated in FIGS. 1, 2 and 3. The liner 12 oriented with the upper opening 20 facing upwards is held by the pick-up element 36 above the conveyor 60. The manipulator 42 inserts the gripping member 44 inside the liner 12 held in an upright position by the pick-up member 36. The dimensions of the gripping tool 44 correspond to the dimensions of the liner 12. The gripping tool 44 is inserted inside the liner 12 until the sensors 58 come into contact with the bottom wall 16 of the liner 12. In this condition, the expandable gripper 50 of the gripping tool 44 is positioned inside the open upper edge 20 of the gripping element 12. At this point, the expandable membrane 52 is inflated, which increases its diameter and grips the inside of the open upper edge 20 of the gripping element 12. At this point, the manipulator 42 moves the gripping tool 44 with the corresponding liner 12 above a container 14 and inserts the gripping tool 44 and the liner 12 held thereby inside the container 14. During this step, the pick-up element 36 of the de-stacking device 32 is positioned above the stack 26 to pick up a new liner 12.

The liner 12 held by the gripping tool 44 is inserted inside the container 14 and is arranged with the fold 22 outside the open upper edge of the container 14. After having positioned the liner 12 inside the container 14, the pressing element 56 of the gripping tool 44 is lowered so as to press the fold 22 against the upper edge of the container 14. At this point, the expandable membrane 52 is deflated so as to reduce its diameter and to disengage the gripping tool 44 of the liner 12. Then, the gripping tool 44 is extracted from the container 14 leaving the liner 12 inside the container 14. At this point, the container 14 in which a liner 12 has been positioned advances on the conveyor 60 in the direction A towards a filling station and the cycle is repeated for a new container.

Of course, the details of construction and the embodiments can be widely varied with respect to those described and illustrated, without thereby departing from the scope of the invention as defined by the claims that follow.

For example, the elements for gripping the liners 12 may be different from those described and illustrated. In alternative embodiments, the elements for gripping the liners 12 from the top of the stack 26 could be magnetic or mechanical gripping elements (pincers or the like). In the same way, other types of elements could be used by the gripping tool 44 for gripping the liners 12, for example, suction, magnetic or mechanical means, etc.

The invention claimed is:

1. A method for applying liners inside containers, comprising:
    providing a plurality of liners each having a bottom wall, a side wall, an upper opening opposite the bottom wall and a fold extending around an edge of the upper opening,
    placing said plurality of liners in at least one vertical stack in which the plurality of liners are upside-down,
    pulling a first liner of the plurality of liners at a top of the at least one vertical stack out of the at least one vertical stack in a vertical direction and overturning the first liner so as to orient it vertically with the upper opening facing upwards,
    inserting a gripping tool into the first liner and gripping the first liner with said gripping tool,
    inserting the gripping tool and the first liner held thereby inside a container and placing the first liner inside the container, and
    releasing the first liner into the container and removing the gripping tool from the container.

2. The method according to claim 1, wherein each of said plurality of liners are removed from said at least one vertical stack and moved along a path having substantially a shape of an upside-down U.

3. The method according to claim 1, wherein the bottom wall of the first liner at the top of the at least one vertical stack is gripped.

4. The method according to claim 1, wherein said gripping tool grips the edge of the upper opening of the first liner from an inside of the first liner.

5. The method according to claim 1, wherein the gripping tool has a lower plate that rests against an inner surface of the bottom wall of the first liner.

* * * * *

UNITED STATES PATENT AND TRADEMARK OFFICE
CERTIFICATE OF CORRECTION

PATENT NO. : 11,731,286 B2
APPLICATION NO. : 16/812425
DATED : August 22, 2023
INVENTOR(S) : Luca Drocco It is certified that error appears in the above-identified patent and that said Letters Patent is hereby corrected as shown below:

On the Title Page

(71) Applicant address information should be listed as:
- DROMONT S.p.A., Grinzane Cavour (Cuneo), ITALY -

(72) Inventor address information should be listed as:
- Luca Drocco, Alba (Cuneo), ITALY -

(73) Assignee address information should be listed as:
- DROMONT S.p.A., Grinzane Cavour (Cuneo), ITALY -

Signed and Sealed this
Twenty-sixth Day of March, 2024

Katherine Kelly Vidal
*Director of the United States Patent and Trademark Office*